United States Patent [19]
Loqvist

[11] 3,772,749
[45] Nov. 20, 1973

[54] COMPOSITE WHEEL
[75] Inventor: Kaj Ragnar Loqvist, Fagersta, Sweden
[73] Assignee: Fagersta Bruks Aktiebolag, Fagersta, Sweden
[22] Filed: Mar. 31, 1972
[21] Appl. No.: 240,020

Related U.S. Application Data
[62] Division of Ser. No. 8,833, Feb. 5, 1970, Pat. No. 3,673,677.

[30] Foreign Application Priority Data
Feb. 14, 1969 Sweden.............................. 2059/69

[52] U.S. Cl.................................... 29/130, 29/132
[51] Int. Cl............................................ B21b 31/08
[58] Field of Search..................... 29/125, 130, 132, 29/487, 488, 498

[56] References Cited
UNITED STATES PATENTS
3,432,902  3/1969  Rackoff et al. ....................... 29/125
3,609,849  10/1971  Krol................................... 29/132

Primary Examiner—Alfred R. Guest
Attorney—Herbert H. Goodman

[57] ABSTRACT

The invention provides a composite wheel having a hardened steel body rimmed with a hard metal carbide peripheral surface rim. The hard metal carbide peripheral surface is physically in contact with said steel body along the central portion of the periphery of said steel body. The hard metal carbide rim is brazed to said steel body by means of two joints. One of the brazed joints is between the hard metal carbide rim and said steel body along one side of said periphery and the other said joints along the other side of said periphery. The two joints are separated by the central portion of said hard metal carbide rim which is physically in contact with said steel body.

3 Claims, 3 Drawing Figures

PATENTED NOV 20 1973 3,772,749

COMPOSITE WHEEL

This is a division of application Ser. No. 8,833, filed Feb. 5, 1970, which issued as U.S. Pat. No. 3,673,677 on July 4, 1972.

BACKGROUND OF THE INVENTION

As is well known, brazing involves joining with a metal which at room temperature is harder and has a higher melting point than the usual tin solder, examples of such metals being silver solder and copper solder. When brazing two articles together, they are heated to a temperature which is about the same as, or at least not less than, the melting point of the brazing filler metal. For example, articles which are to be brazed together using a specified quality of silver solder must be heated to about 800° C. If said articles have substantially different coefficients of heat expansion, stresses or strains will arise in the brazed junction or joint between them and therefore also in said articles because of the contraction that occurs during the cooling of the articles after the brazing operation. As an example, during brazing of a hard carbide metal (e.g., WC and/or TiC and/or TaC) to a steel article with silver solder, the latter article will contract more than the former during cooling, which has the effect that the combined body of said two articles will bend in such a way that the center of deflection will be situated on the same side of the junction as the steel article. If this deflection or bending is strong enough, it may well happen either that the brazed joint breaks or that the hard carbide metal article breaks or is partially or completely detached. Therefore, brazing can be used only for joints which are not too large in extension. It is an object of the present invention to produce composite articles by brazing two articles having substantially different coefficients of heat expansion.

SUMMARY OF THE INVENTION

The present invention comprises a process whereby an article having a higher coefficient of heat expansion is cooled under controlled conditions during the brazing operation, so that its subsequent contraction, when the combined body has cooled at the end of the brazing operation, is of substantially the same magnitude for both of the two articles being joined. This results in eliminating the strains in the brazed joint. The method of the present invention thus provides a brazed joint which is practically neutral with regard to so called macrostrain, whereas the so called microstrain (strains in the brazed junction) depends on the thickness of the brazed junction itself and the extension of the heated zone during the brazed process.

DESCRIPTION OF THE PREFERRED EMBODIMENTS

Figure 1:
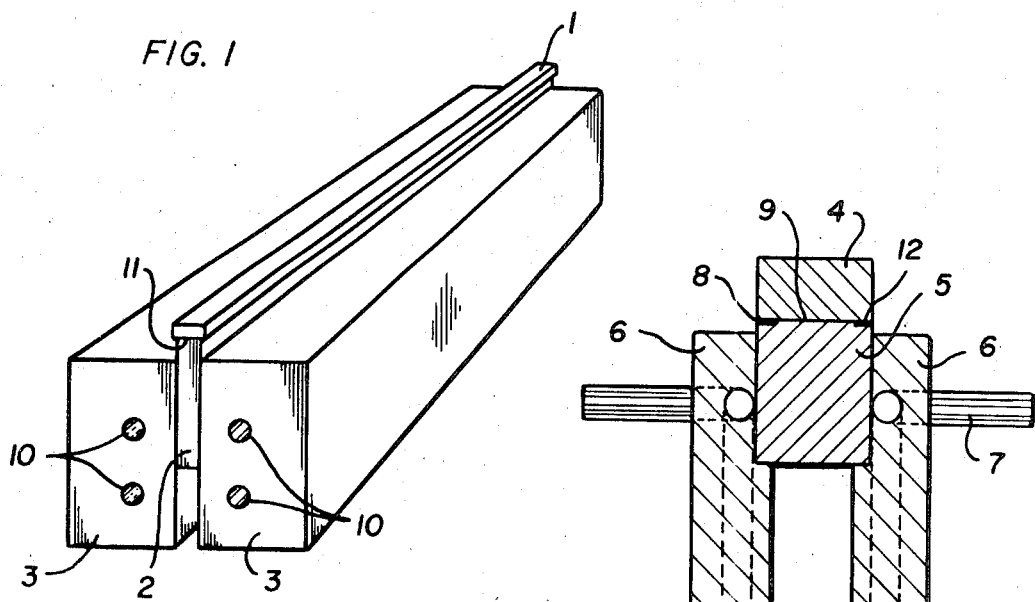
FIG. 1 is a perspective view of a composite body mounted with cooling plates in operative position for cooling during a brazing operation.

In its broadest aspects the present invention provides a method of joining a first article and a second article, said second article having a higher coefficient of heat expansion than said first article comprising positioning said articles adjacent each other and applying brazing filler metal to the joint between said articles and heating said brazing filler metal sufficient to braze said first and second articles together along said joint and then cooling said articles to obtain a permanent joint between them; and cooling said second article, while said solder is being heated sufficiently so that the amount of contraction of said second article during the cooling period subsequent to the brazing is substantially of the same magnitude as the contraction of said first article.

The method of the present invention is particularly useful to manufacture elongated articles and/or round or circular or flat articles having a rim or circular segment attached to a flat side prepared by joining an elongated hard metal carbide article with a second article, said second article having a higher coefficient of heat expansion than said hand metal carbide article comprising positioning said articles adjacent each other and applying brazing filler metal to the joint between said articles and heating said brazing filler metal sufficient to braze said articles and then cooling said articles to obtain a permanent joint between them; and cooling said second article, while said brazing filler metal is being heated, sufficiently so that the amount of contraction of said second article during the cooling period subsequent to the brazing is substantially of the same magnitude as the contraction of said elongated hard metal carbide article.

The foregoing methods permit the manufacture of novel articles including a composite wheel having a hardened steel body rimmed with a hard metal carbide peripheral surface rim, said hard metal carbide peripheral surface being physically in contact with said steel body along the central portion of the periphery of said steel body; said hard metal carbide rim being to said hard metal steel body by means of two joints, one of said soldered joints being between said hard metal carbide rim and said steel body along one side of said periphery and the other of said joints being along the other side of said periphery, said joints being separated by the central portion of said hard metal carbide rim physically in contact with said steel body.

In the specification herein, the term "wheel" is used in its broadest sense and is generic to such devices as pulleys, drums, gears, bosses, etc.

The hard metal carbide articles are illustrated by such tool materials and/or wear resistant materials as tungsten carbide and/or titanium carbide and/or tantalum carbide. These materials may be sintered or cemented carbides.

The amount of cooling of the article having the higher coefficient of heat expansion carried out during the brazing operation is dependent upon the particular materials of which the articles are constructed, the size and shape of the article and the joint, the type of brazing filler metal and the process conditions utilized during brazing, i.e., amount and rate of heat application, etc. In each case the amount of cooling necessary is readily determined for each operation. The result of the cooling is that the article being cooled is not so heated during the brazing operation that it expands greatly with a consequent greater contraction which causes the macrostrains and microstrains referred to hereinbefore. The cooling is utilized to allow only sufficient expansion that the consequent contraction is of the same magnitude as the contraction of the article having the lower coefficient of heat expansion. The term "same general magnitude" is used to encompass those small differences in contraction which do not result in an unsound joint for the service conditions contemplated.

Figure 2:
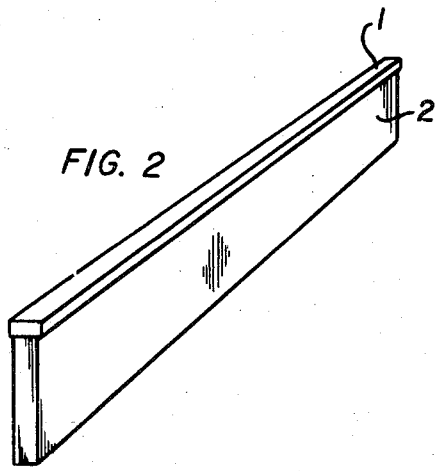
FIG. 2 is a perspective view of the same composite body as in FIG. 1.

The invention is further illustrated by reference to the drawings with initial reference to FIGS. 1 and 2. A rod 1 of hard carbide metal, e.g., WC, is to be brazed to a steel rail 2. Said steel rail 2, which has the higher coefficient of heat expansion, is cooled by two clamping bars 3 of copper. Said cooling is controlled in such a manner that parts of said steel rail 2 (the cooled part) is maintained at a specified temperature with respect to the temperature of the rod 1 of hard carbide metal. Said clamping bars 3 may be cooled by a cooling liquid, for example water, which flows through the clamping bars and which is maintained at a specified temperature. The clamping bars 3 may be cooled by passing the cooling water through longitudinal openings 10 running entirely through each of the clamping bars 3.

By carrying out the brazing operation and therefore also the heating successively from one end of the junction 11 to the other end, and because the steel rail 2 is cooled at all times during the brazing operation, only local differences in expansion between the rod 1 and steel rail 2 will occur. It is important that the temperature of the steel rail 2 should not be lowered too greatly, i.e., excessive cooling applied to the steel rail 2. This could result in such a severe control of the heat expansion of the steel rail 2 that it is actually less than the expansion of the rod 1 and in that instance the rod 1 could act as if it were the article having the higher coefficient of heat expansion and contract excessively relative to the contraction of the steel rail 2.

In accordance with the foregoing, a tungsten carbide rod 1 may be brazed to a hardened steel rail 2 utilizing silver base brazing filler metal by the application of heat sufficient to raise the temperature of the silver-base brazing filler metal and the temperature of the surfaces of rod 1 and steel rail 2 meeting at junction 11 to about 800°C.

Figure 3:
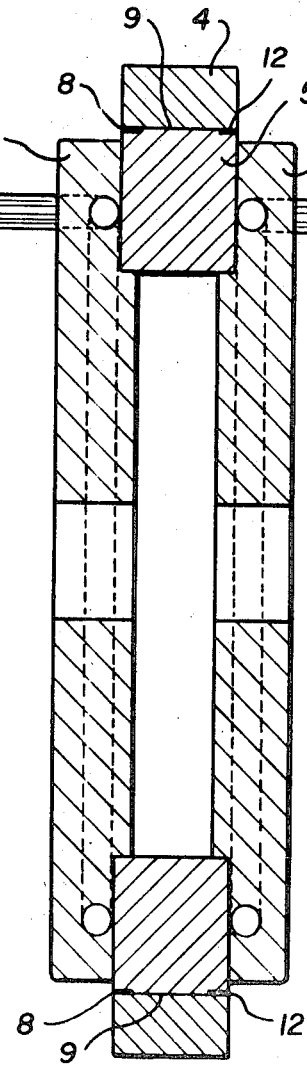
FIG. 3 is a cross-sectional view of a steel boss rimmed with a hard metal carbide and positioned with the cooling apparatus used during the brazing operation.

FIG. 3 shows, in section, how a ring 4 of hard carbide metal can be brazed to a hardened steel roller body or steel boss 5 of a so called "Kocks block" for wire rolling. A brazed joint 8 is to be made along the edges of the joint between the ring 4 and the boss 5, whereas at the central portion 9 of the joint the ring shall have direct contact with the boss 5, so that the rolling pressure can be transmitted directly from the ring 4 to the boss 5. A corresponding brazed joint 12 is to be made along the other side of the central portion 9. During the brazing operation the boss 5 is cooled through a circular cooling body 6 of copper, through which cooling water is passed through channels 7. Previous to the present invention it has been considered as impossible to achieve brazed joints of this kind, that is to say brazed hardened steel, because the hardening was lost by the heating during the brazing operation.

Utilization of the invention is not confined to those examples which are given above but embraces all operations and composite articles which fall within the scope of the claims.

What is claimed is:

1. A composite wheel having a hardened steel body rimmed with a hard metal carbide peripheral surface rim, the inner surface of said hard metal carbide peripheral surface being physically in contact with said steel body along the central portion of the periphery of said steel body; said hard metal carbide rim being brazed to said steel body by means of two brazed joints, one of said brazed joints being between said hard metal carbide rim and said steel body along one side of said inner surface and said periphery and the other of said brazed joints being along the other side of said inner surface and said periphery, said joints being separated by the central portion of said hard metal carbide rim physically in contact with said steel body.

2. The composite wheel of claim 1 wherein said brazed joints are joints of silver-base brazing filler metal.

3. The composite wheel of claim 1 wherein said brazed joints are joints of copper-base brazing filler metal.

* * * * *